April 12, 1955     P. L. PAULL     2,706,147
PROCESS FOR AMMONIA MANUFACTURE
Filed July 1, 1953
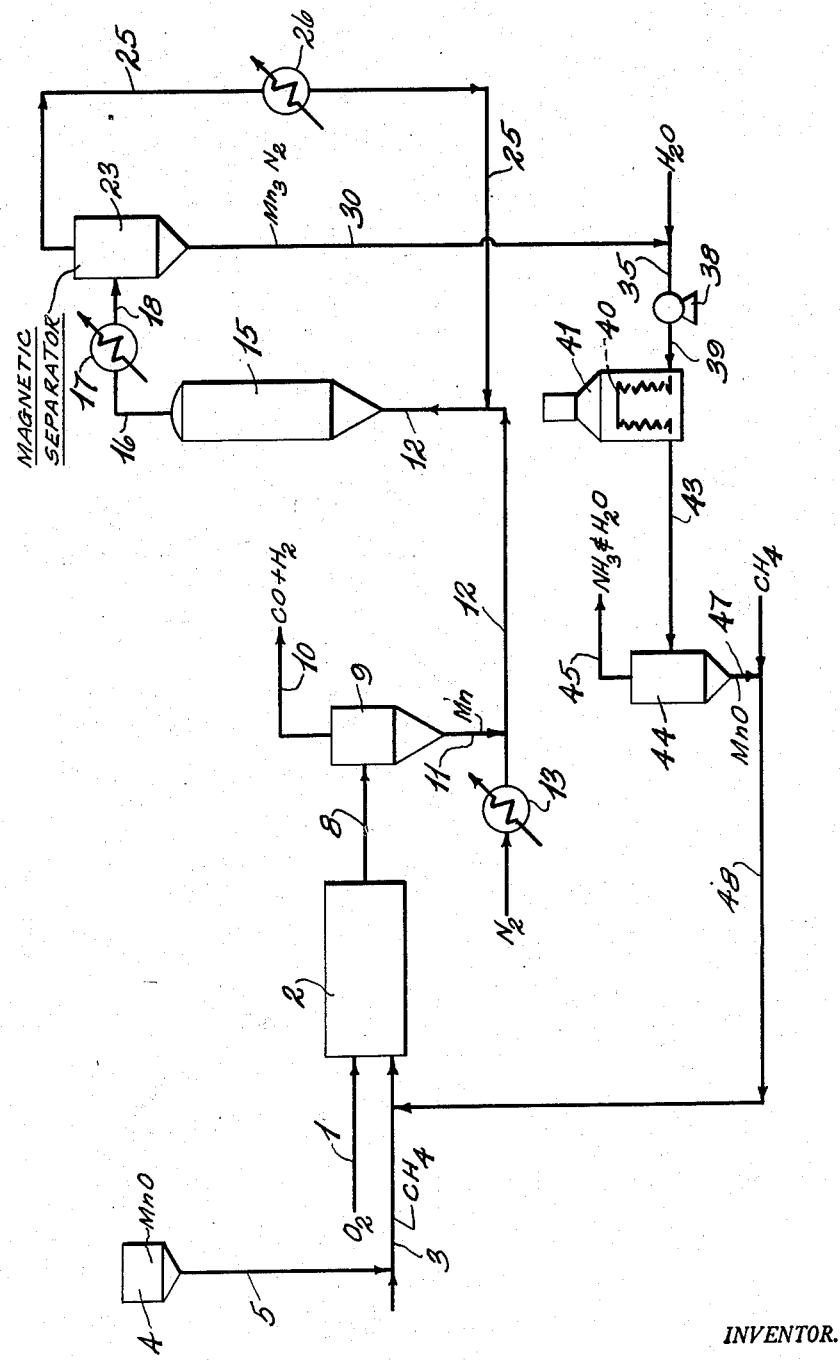
INVENTOR.
BY United States Patent Office 2,706,147
Patented Apr. 12, 1955

2,706,147

PROCESS FOR AMMONIA MANUFACTURE

Peter L. Paull, Norwalk, Conn., assignor to Texaco Development Corporation, New York, N. Y., a corporation of Delaware Application July 1, 1953, Serial No. 365,416

12 Claims. (Cl. 23—193)

This invention relates to a nitrogen fixation process in which a valuable synthesis gas stream is produced as a by-product. More particularly, this invention involves an integrated process for preparing synthesis gas and ammonia.

Nitrogen fixation is becoming an increasingly more important commercial development with the recognition of the importance of fertilizers to our agricultural economy. The reaction of nitrogen and hydrogen at elevated pressures to produce synthetic ammonia has been the major means for effecting nitrogen fixation. The nitrogen reactant for the synthetic ammonia reaction is usually obtained by air rectification. The hydrogen reactant is obtained by a wide variety of processes; depending upon the economics in the particular locality and country, hydrogen is usually obtained electrically or by combustion of hydrocarbonaceous fuels such as natural gas, fuel oil and coal. At the present time, widespread acceptance has been accorded a partial combustion process for producing hydrogen in the partial combustion process, a carbonaceous fuel such as natural gas is converted to a mixture primarily composed of carbon monoxide and hydrogen which is subjected to a water-gas shift reaction to yield carbon dioxide and additional amounts of hydrogen. Manufacture of hydrogen for ammonia production by the partial combustion process expends the carbon monoxide-hydrogen synthesis gas mixture which is valuable in its own right.

The process of the present invention provides an integrated ammonia-producing process in which a valuable carbon monoxide-hydrogen gas stream is produced as a by-product. In accordance with the process of this invention, a carbonaceous fuel is reacted with oxygen at a temperature above 1,800° F. in the presence of particulate manganese oxides with or without water with the resulting producting of metallic manganese and a gas mixture comprising carbon monoxide and hydrogen. After separation of the metallic manganese from the carbon monoxide-hydrogen gas mixture, it is reacted with nitrogen at a temperature of 1,000 to 2,200° F. to form manganese nitrides which are readily separated from unconverted metallic manganese because of their highly magnetic properties. The manganese nitrides, after separation from unconverted metallic manganese, are reacted with water to yield manganese oxides and ammonia. The manganese oxides formed in the hydrolysis of manganese nitrides are recycled to the reaction zone wherein the carbonaceous fuel is reacted with oxygen with the resulting formation of additional quantities of carbon monoxide, hydrogen and metallic manganese.

The main cooperative feature of the integrated process of this invention is that the manganese oxides produced in the hydrolysis of the manganese nitrides to ammonia are recycled to the partial combustion zone where they supply a portion of the oxygen required for the combustion of the carbonaceous fuel during its reduction to metallic manganese.

The major advantage of the process of this invention over former processes for making synthetic ammonia is that it is not necessary to expend the hydrogen originating with the combustion of a carbonaceous fuel since the hydrogen for ammonia manufacture is obtained from water in the hydrolysis of manganese nitride. The synthesis gas mixture resulting from the partial combustion is still available for hydrogen manufacture, for use in the manufacture of synthetic gasoline, in the carbonylation reaction or for the manufacture of other chemicals.

The carbonaceous fuel used in the partial combustion step of this invention can be coal, shale, lignite, fuel oil or natural gas; these materials can be reacted with oxygen to yield a product gas comprising mainly carbon monoxide and hydrogen. With hydrogen-deficient fuels such as coal, it is customary to add steam to the combustion reaction to increase the hydrogen content of the product gas. The preferred carbonaceous fuel is natural gas which has a methane content over 95 per cent. In further description of the invention, natural gas will be used in the combustion step wherein metallic manganese and a synthesis gas comprising carbon monoxide and hydrogen are produced.

A mixture of manganese oxides or one particular manganese oxide can be employed in the process of the invention. Manganese exists in a number of states of oxidation ranging from manganous oxide, MnO, to manganese hepta-oxide, $Mn_2O_7$. As used hereafter in the description of the invention, natural gas will be used in the one of the various oxides or to mixtures thereof. However, for purposes of illustration, manganous oxide, MnO, will be employed.

The presence of finely divided manganese oxides having a particle size in the approximate range of 0.1 to 300 microns supplies part of the oxygen requirement of the partial combustion reaction. This substantially reduces the cost of synthesis gas production since the oxygen reactant is a major item of expense in the production of synthesis gas. The reaction of methane with oxygen and a manganese oxide to yield carbon monoxide and hydrogen and metallic manganese is shown in the following equation:

$$4CH_4 + 1\tfrac{1}{2}O_2 + MnO \rightarrow 4CO + 8H_2 + Mn$$

This particular reaction is effected at a temperature above 1,800° F. and preferably between 2,100 and 3,200° F. Pressures between atmospheric and 4,000 p. s. i. g. are employed in the partial combustion reaction with 100 to 500 p. s. i. g. being the preferred range.

The usual ratio of reactants in the partial combustion is that shown in the above equation, namely, 4 mols of methane, 1.5 mols of oxygen and 1 mol of manganese oxide. However, mol ratios between the limits of 4:2:1.5 and 2:1:0.15 $CH_4:O_2:MnO$ can be used in the reaction. In the event that hydrogen-deficient fuels such as coal are used in the partial combustion zone, steam is added to the reaction mixture. A typical reaction mixture using coal as the carbon source comprises 6 mols of coal, 1.5 mols of oxygen, 1 mol of manganese oxide and 2 mols of water.

After removal from the partial combustion zone, metallic manganese is separated from the carbon monoxide synthesis gas in a cyclone separator or other means of effecting separation of a solid from a gas. The metallic manganese is then reacted with nitrogen obtained from air rectification at a temperature between 1,000 and 2,200° F. and at a pressure between atmospheric and 3,000 p. s. i. g. The preferred temperature range is between 1,400 and 1,900° F. The preferred pressure range falls between 100 and 500 p. s. i. g. and is usually the same as that employed in the partial combustion zone. It is recommended that a large excess of nitrogen over the stoichiometric required for the formation of manganese nitride be employed in this reaction. Metallic manganese combines with nitrogen to yield a mixture of compounds whose formulae correspond roughly to $Mn_3N_2$. The usual mol ratio of reactants in the manganese nitride-forming reaction zone is 10 mols of nitrogen to 1 mol of metallic manganese.

The manganese nitride-forming reaction is advantageously effected in a fluidized reaction because of the highly exothermic nature of the reaction and because the fluidized reaction system adapts itself to separation of the formed manganese nitrides from the reactants. The nitrogen reactant which is employed in substantial excess serves well as a fluidizing medium for the metallic manganese. The suspension type reaction system is preferred, but the other variations of fluidized operation such as fluid bed and moving bed systems can be employed for the manganese nitride-forming reaction.

Contact times of 0.5 to 20 seconds are recommended for the nitriding reaction in continuous type operation wherein the metallic manganese in a fluidized state is contacted with nitrogen. In batch operation, it is necessary to employ longer reaction times of the order of 0.5 to 10 minutes because of the necessity of removing the heat of reaction from the highly exothermic nitriding reaction.

Separation of manganese nitrides and metallic manganese is simply effected because the nitride is highly magnetic, whereas the metal is non-magnetic. A suspension reaction system is well adapted to continuous operation since manganese nitrides can be separated from the reactor effluent comprising metallic manganese, nitrogen and manganese nitrides by means of a magnetic separator and the manganese and nitrogen reactants recycled to the reaction zone.

Hydrolysis of the manganese nitrides to yield ammonia and manganese oxides is a highly exothermic reaction. It is normally effected at temperatures between 100 and 400° F. with temperatures of about 200 to 250° F. being preferred so that exothermic heat of reaction can be dissipated as the latent heat of vaporization of water. Normally, about 12 to 15 mols of water for every mol of manganese nitride are employed in the hydrolysis reaction; this amounts to about 300 to 400 per cent excess over the stoichiometric. Pressures between atmospheric and 500 p. s. i. g. are normally used for the hydrolysis; preferred pressures for the hydrolysis range between atmospheric and 250 p. s. i. g.

The product ammonia is obtained from the hydrolysis reaction zone by heating, a portion of which is supplied by the exothermic heat of reaction. Any water present in the product ammonia stream can be removed by conventional means.

The manganese oxides are removed from the hydrolysis zone in the form of an aqueous slurry. This slurry can be used per se as a reactant when coal and other hydrogen-deficient fuels are used in the partial combustion zone. In the preferred modification involving the use of methane in the partial combustion zone, it is necessary to separate manganese oxides from the slurry prior to their recycle to the partial combustion zone. The removal of water while effecting subdivision of the manganese oxide into fine particles can be accomplished by the process of the copending application, Serial No. 49,626, filed September 16, 1948, in the names of Du Bois Eastman and Leon Gaucher. In accordance with the process of the copending application, solids are ground to fine particles by passing an aqueous slurry of the solid through a heating coil at high velocity; the suspended solid is ground to fine particles by the turbulence resulting from conversion of the liquid carrier to the vapor state. On expansion of the gases, the suspended particles are separated from the vapor carrier by conventional means or solid-vapor separation. Passage of the aqueous slurry of manganese oxides through a slurry grinding process of this type results in desirable conversion of the manganese oxides to a fine state of subdivision concurrently with its separation from water.

In a preferred modification of the invention hydrolysis of the manganese nitrides to ammonia and manganese oxides and separation of the manganese oxides from the aqueous ammonia mixture are simultaneously effected in the slurry grinding operation. In this modification, a water slurry of manganese nitrides is pumped at high velocity through a heated coil; hydrolysis of the manganese nitrides simultaneously takes place. Some of the energy required to vaporize the water carrier is supplied by the exothermic hydrolysis reaction. On conversion of the mixture of water and product ammonia to the vapor state, the manganese oxides resulting from the hydrolysis reaction are finely ground. On issuance from the coil, the finely ground manganese oxides are separated from the vapor carrier comprising steam and ammonia by conventional means. The particular advantage of this modification is that hydrolysis of manganese nitrides, fine grinding of the manganese oxides and separation of manganese oxides from the water-ammonia mixture are effected in a single operation.

After separation from water and ammonia, the manganese oxides are recycled to the partial combustion zone to take part in the reaction of carbonaceous fuel with oxygen to produce a carbon monoxide-hydrogen mixture.

In the accompanying flow diagram, there is presented a more detailed description of a modification of the invention wherein synthesis gas is produced from methane, the nitriding reaction is effected in a suspension reaction system, and hydrolysis of manganese nitrides and separation of manganese oxides are simultaneously effected in a slurry grinding system.

Oxygen, which is obtained from an air rectification unit not shown, is introduced through a pipe 1 into a partial combustion zone 2 which is maintained at a temperature in the neighborhood of 2,100 to 3,200° F. and at a pressure of about 300 to 400 p. s. i. g. Methane is introduced into the partial combustion zone 2 through a pipe 3. Manganese oxide is introduced into the methane stream from a hopper 4 through a standpipe 5 and is carried into the combustion zone in the methane stream. The oxygen and methane streams are usually preheated to a temperature of about 1,000° F. prior to introduction into the combustion zone by conventional heat exchange means not shown.

In the combustion zone 2, a mixture of carbon monoxide and hydrogen is obtained by reaction of methane, oxygen and manganese oxide, and manganese oxide is reduced to metallic manganese.

The carbon monoxide-hydrogen mixture containing suspended metallic manganese is removed from the combustion zone 2 through a pipe 8, and is introduced into a gas-solids separator 9. From the upper portion of the gas-solids separator 9, which can be of the cyclone type, a product carbon monoxide-hydrogen stream is obtained through the pipe 10.

Metallic manganese is removed from the bottom portion of the separator 9 through a pipe 11 and is introduced into a conduit 12 through which nitrogen obtained from an air rectification unit, not shown, is passed. There is advantageously a heat exchanger 13 in the line 12 for preheating the nitrogen to a temperature of about 1,000 to 1,500° F. prior to introduction into the nitriding reaction. The nitrogen stream containing suspended metallic manganese, which is at a temperature of about 1,600° F., is introduced through the pipe 12 into the nitriding reaction zone 15.

In the nitriding reaction zone, which is maintained at a temperature of about 1,800° F. and a pressure of about 350 p. s. i. g., which corresponds to the pressure employed in the combustion zone 2, manganese and nitrogen combine to form a mixture of manganese nitrides in an exothermic reaction. The reactor 15 can be equipped with heat exchange means to aid in control of the reaction temperature. The use of a large excess of nitrogen is of material assistance in controlling the temperature.

In the drawing, reaction between metallic manganese and nitrogen is shown as being effected in a suspension type system wherein the reactant metallic manganese and the product manganese nitrides are carried through the reaction zone suspended in the nitrogen reactant. It will be understood that other fluidized type reaction systems such as the fluid bed and the moving bed, as well as a fixed bed type reaction zone, can be employed for the production of manganese nitrides by reaction between metallic manganese and nitrogen.

There issues from the upper portion of the reaction zone 15 through the pipe 16 a stream of nitrogen containing suspended therein unconverted metallic manganese and manganese nitrides. The manganese nitrides are readily separated from this stream because of their highly magnetic properties. Accordingly, after being cooled to a temperature below about 600° F. in the heat exchanger 17, the nitrogen suspension of manganese nitrides and manganese metal is introduced through a pipe 18 into a magnetic separator 23.

In the magnetic separator 23, the nitrogen suspension passes through a magnetic field whereby the manganese nitrides are removed from the suspension. There issues from the upper half of the separator 23 a nitrogen suspension of metallic manganese which is recycled through the pipe 25 to the nitriding reaction zone 15. A heat exchanger 26 inserted in the line 25 serves as means of raising the nitrogen suspension of finely divided manganese to the desired level of about 1,600° F.

On removal from the separator 23, manganese nitrides pass through the pipe 30 into a conduit 35 wherein they are combined with water. The water slurry of manganese nitrides is introduced through the pipe 35 into a pump 38 wherein the linear velocity of the liquid slurry is raised to a level such that turbulent flow exists in the liquid state; a linear flow of 1 to 20 feet per second is specified for obtaining sufficient turbulence in the liquid stream to effect slurry grinding during the subsequent vaporization of the slurry.

During the raising of the linear velocity of the manganese nitride-water slurry to the point of turbulent flow, hydrolysis of manganese nitrides to ammonia and manganese oxides takes place. Since the reaction is exothermic, the temperature level of the slurry medium is raised by the hydrolysis.

After issuance from the pump 38, the high velocity liquid slurry comprising water, manganese nitrides, ammonia and manganese oxides, the latter two being formed by the hydrolysis of the manganese nitrides, is introduced through a pipe 39 into a coil 40 located in a furnace 41. The water component of the high velocity slurry is vaporized by indirect heat exchange in the coil 40. The hydrolysis of manganese nitrides to ammonia and manganese oxide is completed during the vaporization of the water. Fine grinding of the manganese oxides is obtained by the turbulence resulting from the vaporization.

On issuance from the furnace 41, the high velocity steam-ammonia mixture containing suspended finely ground manganese oxides is introduced into a cyclone separator 44 through a pipe 43. A steam-ammonia stream is obtained from the upper part of the separator 44 through a pipe 45. The ammonia-steam mixture can be condensed to form an ammonia hydroxide solution or can be separated by known means.

Finely divided manganese oxides are withdrawn from the bottom portion of the separator 44 through a standpipe 47 and are introduced into a stream of methane passing through the pipe 48. The finely divided manganese oxides are recycled to the combustion zone 2 suspended in methane through the pipe 48.

Although the described unitary procedure is preferred for hydrolyzing the manganese nitrides to ammonia and manganese oxides and for separation of finely divided manganese oxides from the water-ammonia slurry, it will be understood that these different operations can be effected stepwise. Manganese nitride hydrolysis can be effected in a separate reaction vessel and manganese oxide separated from the reaction product by a more conventional process such as filtration. The previously recommended temperatures of 150 to 400° F. for the hydrolysis refer to this type of hydrolysis rather than the unitary operation just described.

The process of the invention is illustrated in the following example:

3,590,000 cubic feet per hour of methane and 1,346,250 cubic feet per hour of oxygen are charged together with 177,500 pounds per hour of manganese oxide into a reaction zone maintained at a temperature of about 2,500° F. and a pressure of about 400 p. s. i. g. with the resulting production of approximately 137,500 pounds per hour of metallic manganese and 10,770,000 cubic feet per hour of synthesis gas comprising predominantly hydrogen and carbon monoxide in the ratio of approximately 1.85 mols of hydrogen to 1 mol of carbon monoxide. On separation of the metallic manganese from the synthesis gas, there are recovered approximately 131,000 pounds per hour which are charged to the subsequent nitriding reaction. The recovered metallic manganese is combined with 8,550,000 cubic feet per hour of gaseous nitrogen which have been preheated to a temperature of about 1,350° F. The nitrogen reactant comprises 8,260,000 cubic feet per hour of recycle gas and 290,000 cubic feet per hour obtained as a by-product of the air rectification plant which produces the oxygen necessary for the original partial combustion reaction. The metallic manganese and nitrogen are reacted at a temperature of about 1,800° F. and a pressure of about 400 p. s. i. g. to yield 153,250 pounds per hour of manganese nitride of the general formula $Mn_3N_2$. On cooling the product stream from the nitriding reaction to a temperature below about 600° F., manganese nitride is separated by magnetic means from the excess nitrogen reactant which amounts to 8,260,000 cubic feet per hour and is recycled to the nitriding reaction; 145,750 pounds per hour of manganese nitride are recovered from the separation operation and slurried with 400 gallons per minute of water. The aqueous slurry of manganese nitride is pumped through an externally fired tube at a linear velocity in the liquid phase of approximately 12 feet per second. The slurry is introduced into the externally fired tube at a pressure of approximately 1,000 p. s. i. g. and is heated to a temperature of approximately 800° F., at which temperature the water is converted to steam and the flow velocity tremendously accelerated with the resulting pulverization of the solid. During the passage through the coil, the manganese nitride is hydrolyzed to yield 161,000 pounds per hour of manganese oxide and 543,000 cubic feet per hour of ammonia which amounts to an ammonia production of 308 tons per day. The finely ground manganese oxide is separated from the product ammonia and excess water and is recycled to the partial combustion zone in an amount equivalent to 153,000 pounds per hour. The recycled manganese oxide is supplemented with 24,500 pounds per hour of fresh manganese oxide to give an hourly charge of 177,500 pounds of manganese oxide to the partial combustion zone. The ammonia produced in the hydrolysis of manganese nitride can be recovered in the form of ammonium hydroxide or in the form of anhydrous ammonia. In the event that anhydrous ammonia is desired, the water fraction from which the anhydrous ammonia is recovered and which still contains a small percentage of ammonia is advantageously recycled to the hydrolysis operation.

In the foregoing example, there is obtained a net production of 10,770,000 cubic feet per hour of synthesis gas and 308 tons per day of ammonia from raw materials comprising 24,500 pounds per hour of manganese oxide, 3,590,000 cubic feet per hour of methane, 1,346,250 cubic feet per hour of oxygen and 290,000 cubic feet per hour of nitrogen.

Obviously, many modifications and variations of the invention, as hereinbefore set forth, may be made without departing from the spirit and scope thereof and, therefore, only such limitations should be imposed as are indicated in the appended claims.

I claim:

1. A process for preparing ammonia which comprises reacting a carbonaceous fuel with oxygen and manganese oxide at a temperature above 1,800° F. whereby a product gas comprising mainly carbon monoxide and hydrogen is formed and said manganese oxide is converted to metallic manganese, separating said manganese from said product gas, reacting manganese with nitrogen at a temperature of 1,000 to 2,200° F. and under pressures of 100 to 4,000 p. s. i. g. to form manganese nitride, reacting said manganese nitride with water to yield manganese oxide and ammonia, separating manganese oxide from water and ammonia and recycling said manganese oxide to the reaction zone to react with said carbonaceous fuel and oxygen.

2. A process according to claim 1 in which natural gas is reacted with oxygen and manganese oxide at a temperature between 2,100 and 3,200° F. and at a pressure between 100 and 500 p. s. i. g.

3. A process according to claim 1 in which the manganese oxide has a particle size between 0.1 and 300 microns.

4. A process according to claim 1 in which methane is reacted with oxygen and manganese oxide at mol ratios between 4:2:1.5 and 2:1:0.15 $CH_4:O_2:MnO$.

5. A process according to claim 1 in which manganese is reacted with nitrogen at a temperature between 1,400 and 1,900° F., at a pressure between atmospheric and 700 p. s. i. g. and at a ratio of about 10 mols of nitrogen per atmospheric weight of manganese.

6. A process according to claim 1 in which the reaction of manganese with nitrogen is effected in a fluid system.

7. A process according to claim 1 in which reaction of manganese nitride with water is effected at a temperature between 100 and 400° F.

8. A process according to claim 1 in which separation of manganese oxide from water and ammonia is effected by raising an aqueous slurry of ammonia and manganese oxide to a velocity sufficient to give turbulent flow in the liquid state, heating said slurry to a sufficient level to effect vaporization of the water component of the slurry whereby manganese oxide is finely ground and separating finely ground manganese oxide from steam and ammonia in a gas-solid separator.

9. A process for preparing ammonia which comprises reacting a carbonaceous fuel with oxygen and manganese oxide at a temperature between 2,100 and 3,200° F. and a pressure between 100 and 500 p. s. i. g. whereby product gas comprising mainly carbon monoxide and hydrogen is formed and said manganese oxide is converted to metallic manganese, separating said manganese from said product gas, reacting manganese with nitrogen at a temperature between 1,400 and 1,900° F. and at a pressure between 100 and 500 p. s. i. g. to form manganese nitride, separating said manganese nitride, combining said manganese nitride with water to form an aqueous slurry, raising said aqueous slurry to a velocity at which turbulent flow in the liquid state is realized with accompanying hydrolysis of said manganese nitride to yield manganese oxide and ammonia, heating said high velocity aqueous slurry to vaporize the water component of said slurry whereby said manganese oxide is finely ground and separating said finely ground manganese oxide from steam and ammonia in a gas-solid separator and recycling said manganese oxide to the reaction zone to react with said carbonaceous fuel and oxygen.

10. A process according to claim 9 in which said aqueous slurry of manganese oxide is raised to a velocity of 1 to 20 feet per second.

11. A process according to claim 9 in which separation of said manganese nitride is effected magnetically.

12. A process according to claim 9 in which manganese is reacted with nitrogen at about 10 mols of nitrogen per gram atom of manganese.

No references cited.